July 7, 1964  K. SCHUBERT  3,139,773
TURNTABLE OR INDEXING TABLE, IN PARTICULAR
FOR INDEXING ATTACHMENTS
Filed Feb. 10, 1961  2 Sheets-Sheet 1

(A-B)

Inventor:
Karl Schubert
By Watson, Cole, Grindle + Watson
Attys.

July 7, 1964 K. SCHUBERT 3,139,773
TURNTABLE OR INDEXING TABLE, IN PARTICULAR
FOR INDEXING ATTACHMENTS
Filed Feb. 10, 1961 2 Sheets-Sheet 2

(C-D)

Inventor:
Karl Schubert
By Watson, Cole, Grindle + Watson
Attys.

United States Patent Office 3,139,773
Patented July 7, 1964

3,139,773
TURNTABLE OR INDEXING TABLE, IN PARTICULAR FOR INDEXING ATTACHMENTS
Karl Schubert, Dusseldorf, Germany, assignor to Firma Rheinmetall G.m.b.H., Dusseldorf, Germany
Filed Feb. 10, 1961, Ser. No. 88,553
Claims priority, application Germany Feb. 13, 1960
4 Claims. (Cl. 74—824)

The invention relates to a turntable or indexing table in which the underside thereof is mounted in a housing or a guide and having a clamping device for fixing said table so that it does not move. The invention differs from the forms of construction heretofore known in particular in that the table is mounted in the housing so that it is sprung axially and that it has on its underside a wedge surface between which the housing or a housing insert a wedge can be shifted to press the underside of the table against a seat located in the housing in opposition to the springing means by downwardly directed pressure of the wedge on the wedge surface.

The invention is suitable in particular for indexing attachments, but its application is not limited thereto.

In a preferred embodiment according to the invention, the table rests on an axially sprung bearing, more particularly a ballbearing, in the housing and the wedge surface is disposed at the outer edge of the top end of a bush arranged fixedly on the underside of the turntable and located axially with respect to the latter, while the wedge is formed as a radially slotted annular disc provided with a conical inner edge, disposed coaxially with the turntable and compressible by secantial or radial pressure and exerting a downwardly directed force component on the bush during this process.

Furthermore, on the underside of the table there is mounted a detachable thrust piece on which the bush is seated. This thrust piece is provided with a toothed wheel which serves to drive the turntable and, to this end, is connected by way of an intermediate transmission gearing or directly to the driving shaft, which can be attached by means of a hand lever. The toothed wheel mounted on the thrust piece is equipped with a freewheel and locking device.

Also mounted on the driving shaft of the gearing is an eccentric for pressing a slidably mounted pressure pin against the periphery of the annular disc, whereby the latter is compressed radially and produces the clamping pressure for fixing the turntable.

Essentially, the invention has the following advantages:

A single hand lever is used for actuating the clamping device and for rotating the turntable, whereby the operating time is considerably reduced. Owing to the fact that a single main shaft is provided and is used both for transmitting the movement of the hand lever to the clamping device and for producing the rotary movement of the turntable, an extremely compact design is possible.

During the clamping action, the table is drawn downwardly in opposition to the spring force of the springing means and is applied tightly against the housing at its bottom plane surface, whereby chatter-free operation is ensured. After the clamping device has been released, the table can be rotated very easily since it is mounted on the spring-supported axial bearing, whereby surface friction between the table and the housing is avoided.

Details of the invention will appear from the following description of the embodiment shown in the drawing and which illustrates the application of the invention in an indexing attachment.

In the drawing:

FIG. 5 is a plan view of the annular disc.

Figure 1:
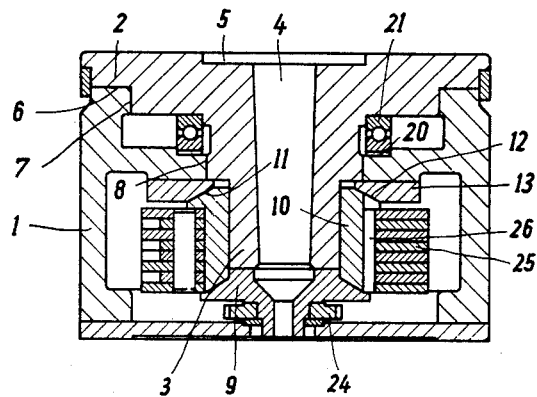
FIGURE 1 is a section through FIGURE 2 in the direction A-B.
Figure 2:
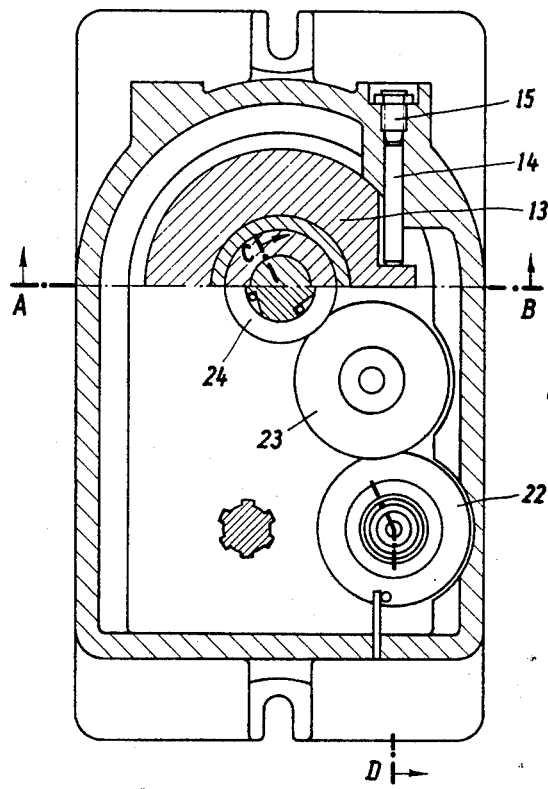
FIGURE 2 is a horizontal longitudinal section through the indexing attachment and shows the intermediate transmission gearing.

In the housing 1 of the indexing attachment there is rotatably mounted the turntable 2, which is designed as a faceplate. The turntable comprises on its underside a journal-like extension 3 which may comprise a through axial bore 4 the shape of which will be seen from FIGURE 1. A concentric recess 5 for receiving workpiece clamps may be provided on the plane surface of the turntable 2.

The turntable 2 is mounted radially at two points in the housing 1, namely firstly at 7 and secondly at 8. Furthermore, the turntable has on its back an annular surface 6 for seating on a corresponding surface of the housing 1 when the turntable is locked or clamped.

The journal-like extension 3 is provided at its lower end with a thrust piece 9 connected detachably thereto by means of screws and serving as a support or seat for a bush 10. The bush 10 has at its top end an inclined or wedge surface 11 serving as a counterpressure surface for a wedge surface 12 located at the inner edge of a radially slotted annular disc 13. Said annular disc 13 is supported at its top against the housing 1. Owing to the radial slot, the annular disc can be compressed. Said disc is secured against rotation by means of a pin 14 held in the housing 1 by a trunnion screw 15.

Figure 4:
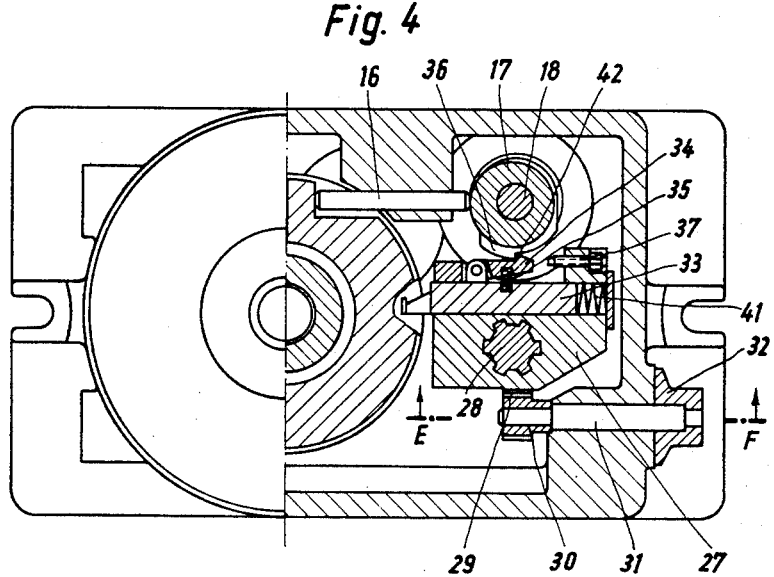
FIGURE 4 is a horizontal section through the indexing attachment and a part view thereof.

A so-called pressure pin 16 is used to compress the annular disc 13, the pressure pin being mounted horizontally and so as to be axially displaceable in the housing 1. One end of the pressure pin bears secantially against the annular disc 13, as will be seen from FIGURE 4. Its outer end is located within the turning range of an eccentric 17 located on a shaft 18 mounted rotatably in the housing 1 and which can be turned by means of a hand lever 19.

When the shaft 18 is rotated in one direction by means of the hand lever 19, the eccentric 17 urges the pressure pin 16 secantially against the annular disc 13, which is thereby compressed and exerts a pressure with its inclined surface 12 on the inclined surface 11 of the bush 10, which is thereby forced downwardly and, by way of the thrust piece 9 and the journal-like extensions 3, presses the annular surface 6 of the turntable 2 against the corresponding annular surface of the housing 1. During this downward movement of the turntable 2, the pressure of a flat spring 20 is overcome, the spring being pressed against a ball bearing 21 on which the turntable rests and which is used for the rotary movement of said turntable 2 when the clamping thereof is terminated, which is effected by swinging the hand lever 19 in the opposite direction. In fact, the pressure of the eccentric 17 on the pressure pin 16 is thereby terminated, so that the annular disc 13 resumes its normal size. It then no longer presses on the bush 10, but on the contrary a clearance now exists between the inclined surfaces 11, 12, so that the spring 20 can relax again and in so doing press the ball bearing 21, and thereby the turntable, upwardly. The annular surface 6 of the turntable 2 is thereby lifted away from the corresponding annular surface of the housing 1. The turntable 2 is now freely rotatable.

The rotary movement of the turntable 2 is effected by swinging the hand lever 19 further. The shaft 17 is thereby rotated and the driving pinion 22 mounted thereon carries along, by way of the toothed wheel 23, the toothed wheel 24 mounted on the thrust piece 9 by means of a freewheel and locking device known per se, said toothed wheel 24 transmitting the rotary movement to the turntable 2 by way of the thrust piece 9 and the journal-like extension 3.

If the turntable 2 is to be clamped again, the hand lever 19 is swung in the opposite direction. Owing to the freewheel locking device, the gearing 22, 23, 24 then runs along idly during the clamping movement, so that the turntable 2 is not rotated.

In the form of construction described, the driving pinion 22 is mounted fixedly on the shaft 18. However, the invention is not limited to the example described. In fact, it has the advantage that, owing to the arrangement of the bush 10, it is possible to mount on said bush a plurality of index plates 25 disposed one above the other, as will be seen from FIGURE 1. These index plates 25 are connected non-rotatably to the bush 10, for example by means of a key 26. Moreover, in this form of construction, it is possible to provide a slide 27 adapted to be shifted up and down on a vertical polygonal spindle 28, to which end there is mounted on one side of the slide a rock 29 with which there meshes a pinion 30 arranged fixedly on a shaft 31 whose end projecting from the housing 1 carries a so-called preselector dial 32.

The slide 27 carries an axially slideable locking pin 33 which is urged against the periphery of the index plates 25 by means of a spring 41. Mounted on the locking pin 33 is a pivoting latch 34 urged by a spring 35.

A driver or entrainment member 36 is mounted on the shaft 18 and, on rotation of said shaft 18 in one direction, engages behind the latch 34 and draws it back in opposition to the pressure of the spring, so that if said latch was previously engaged in a notch in an index plate, it is thereby disengaged. At the end of the stroke, an inclined surface 42 located at the head of the latch strikes against an adjustable stop 37 which may take the form of a trunnion screw and disengages the latch from the driver 36. The spring 41 now drives the locking pin 33 forwardly again against the index plate 25. According to the vertical adjustment of the slide 27 carrying the locking pin 33 by means of the preselector dial 32, the locking pin strikes against one of the index plates 25 and, on rotation of said index plates by means of the hand lever 19 by way of the toothed wheel gearing 22 to 24, engages in the corresponding notch in the respective index plate 25.

Figure 3:
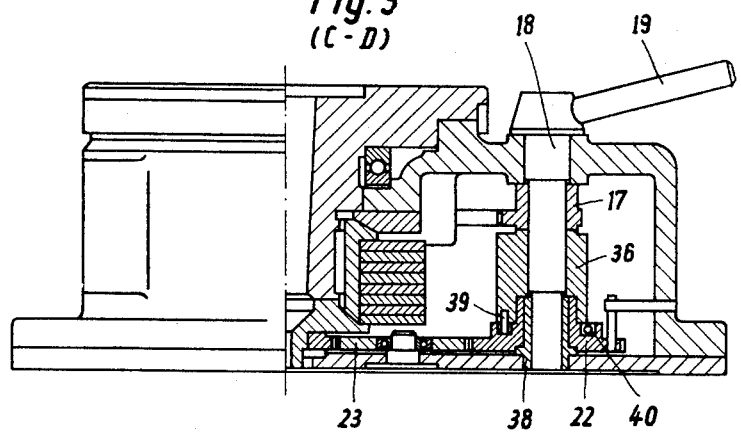
FIGURE 3 is a section through FIGURE 2 in the direction C-D.

When the indexing attachment is completed in this way by means of the preselector device, the driving pinion 22 is not mounted fixedly on the driving shaft but, as will be seen in FIGURE 3, on a bush 38 and engages in the driver 36 which is fixedly mounted on the shaft 18. Said driver is coupled fixedly to the driving pinion 22 by way of a driving or coupling pin 39. The driving pin 39 is so arranged that the entrainment of the driving pinion 22 occurs only when the locking pin 33 releases the respective index plate in which it was engaged. Furthermore, in this form of construction, a return spring 40 is mounted in a groove in the driving pinion and returns the pinion to its initial position when the locking pin 33 is engaged in the desired index plate notch and the hand lever 19 is now to be swung in the direction opposite to that of the previous swinging movement in order to operate the clamping device by which the turntable 2 is pressed firmly at its annular surface 6 against the corresponding annular surface of the housing 1.

If the index plates 25 and the preselector device are dispensed with, that is only the clamping device is used in combination with the gearing to rotate the turntable 2, the over-all height can be reduced by the bush 10 being dispensed with and the annular disc 13 pressing directly on the inclined surface of the thrust piece 9.

What I claim is:

1. A turntable device particularly for indexing attachments, comprising a housing, a turntable mounted by its underside in the housing, a clamping device for fixing said turntable so that it does not move, the table being mounted in the housing so that it is sprung axially and freely rotatable, said clamping device having a wedge surface on the underside which can be shifted to press the underside of the table against a seat provided in the housing in opposition to a spring means by downwardly directed pressure of the wedge on the wedge surface, a ball bearing in the housing on which the table is freely rotatable, a bushing on the underside of the turntable and located axially with respect to the latter, the wedge being formed as an annular disc with a radial slot and provided with a conical inner edge in the slot and disposed coaxially with the turntable and compressible by radial pressure and exerting a downwardly directed force component on the bushing during this directed force, said wedge being supported by its upper side to the housing, and a plurality of plates mounted on the bushing and arranged one on the other as indexing plates.

2. A turntable device according to claim 1, in which a thrust piece is fitted detachably to the underside of the turntable, and in which a toothed wheel is provided having a freewheel locking device for driving the turntable, and in which a transmission gearing and a main driving shaft are provided, said toothed wheel being connected by means of the transmission gearing to the main driving shaft, and means provided to operate the shaft.

3. A turntable device according to claim 1, in which a main driving shaft is provided with a driving pinion of the transmission gearing effects the rotary movement of the turntable, and in which an eccentric is provided for pressing an axially slidable pressure pin disposed horizontally in the housing against the periphery of the wedge which produces the clamping movement for the turntable.

4. A turntable device according to claim 1, in which a flat spring is provided between the ball bearing and the housing.

References Cited in the file of this patent

UNITED STATES PATENTS

| | | |
|---|---|---|
| 2,135,639 | Gorham | Nov. 8, 1938 |
| 2,375,114 | Kylin | May 1, 1945 |
| 2,471,403 | Benes | May 31, 1949 |
| 2,908,195 | Benes | Oct. 13, 1959 |
| 2,921,487 | Schabot | Jan. 19, 1960 |
| 2,952,169 | Johnson | Sept. 13, 1960 |
| 2,979,971 | Darash | Apr. 18, 1961 |